March 17, 1931.                J. O. SARHEIM ET AL                1,797,025
                                  SAFETY AUTOMATIC STOP
                               Filed Nov. 4, 1927      2 Sheets-Sheet 1
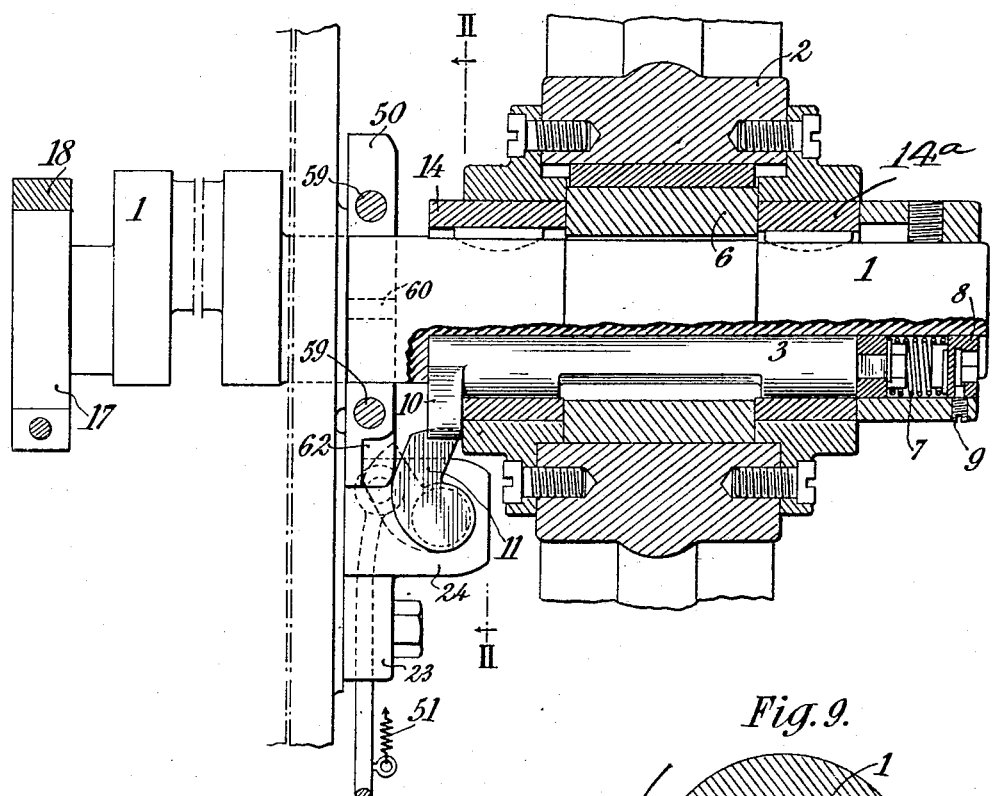
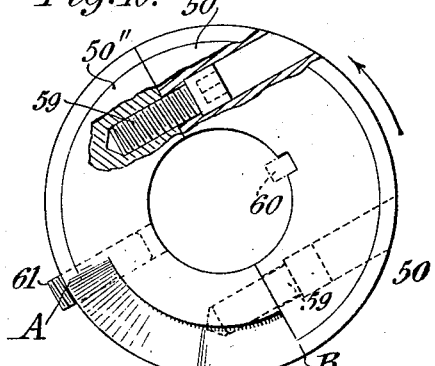
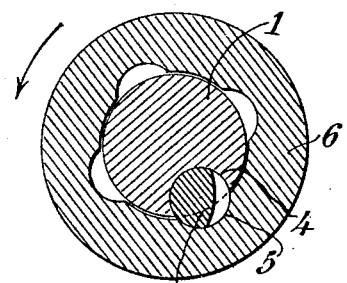
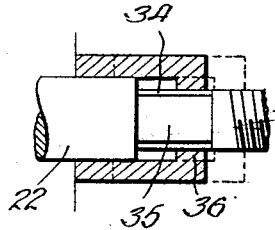
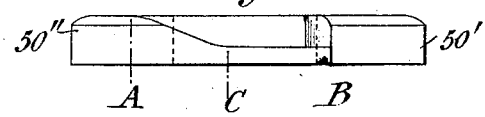
INVENTORS:
John O. Sarheim and
Ove A. Olsen,
By Attorneys, March 17, 1931.    J. O. SARHEIM ET AL    1,797,025
SAFETY AUTOMATIC STOP
Filed Nov. 4, 1927    2 Sheets-Sheet 2
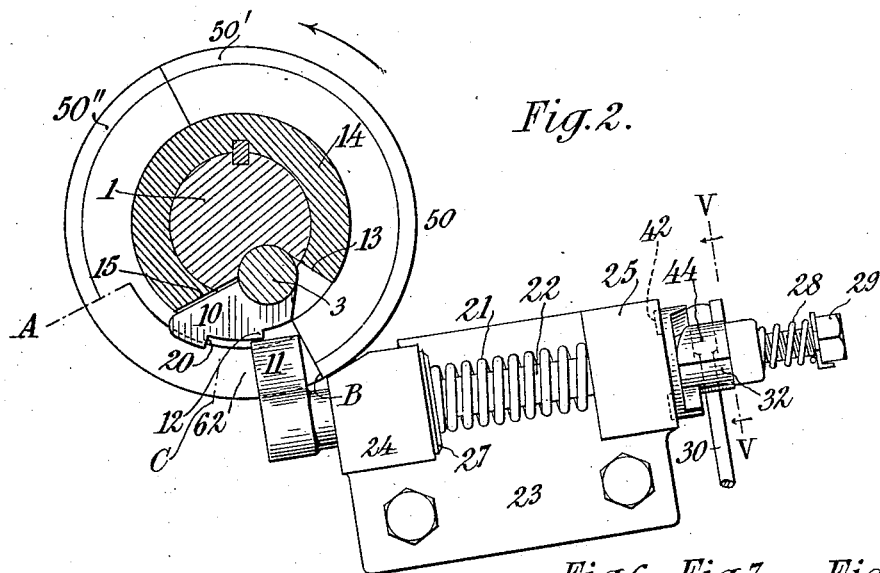
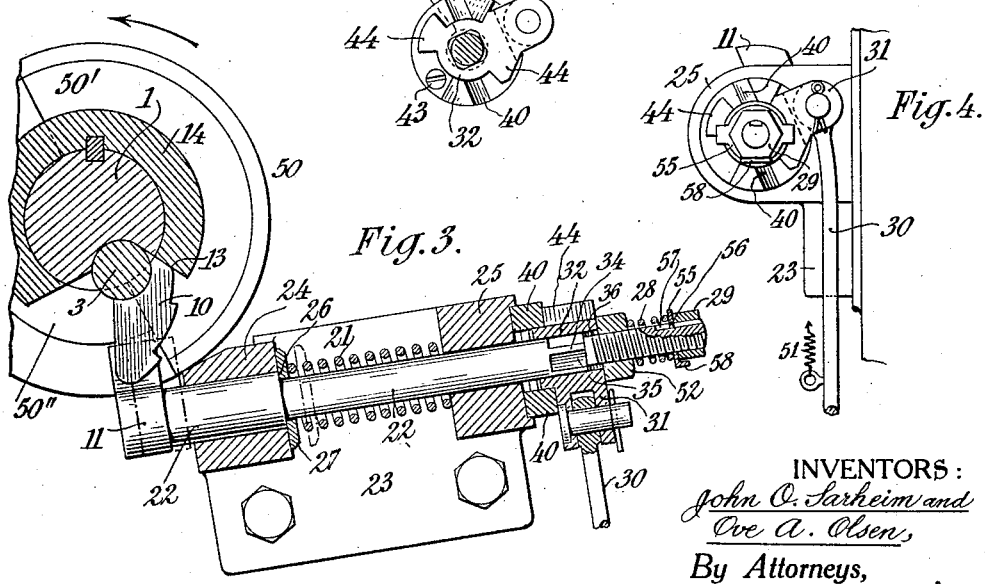
INVENTORS:
John O. Sarheim and
Ove A. Olsen,
By Attorneys, Patented Mar. 17, 1931

1,797,025

UNITED STATES PATENT OFFICE

JOHN O. SARHEIM AND OVE A. OLSEN, OF BROOKLYN, NEW YORK, ASSIGNORS TO E. W. BLISS COMPANY, OF NEW YORK, N. Y., A CORPORATION OF DELAWARE

SAFETY AUTOMATIC STOP

Application filed November 4, 1927. Serial No. 231,011.

This invention relates to improvements in automatic stop devices designed to prevent a second or repeat cycle of operation in power press machines and the like, in the event of the operator failing to remove his foot from the treadle of the machine. In devices of this nature a separate depression of the treadle or other means controlled by the operator for setting the machine in motion must be made for each cycle of operation, this requiring conscious effort on the part of the operator.

This invention has for one object to provide a safety device of the described type which is more positive in operation than devices hitherto known. To this end every part of the safety mechanism is mechanically positive in action while performing its safety function. The use of springs, weights or similar non-positive actuating means is entirely eliminated in so far as the safety operation is concerned.

A further object of the invention is to provide means for warning the operator should a failure in certain parts of the safety mechanism occur.

Another object of the invention is to provide simplified means for throwing out of operation the safety stop mechanism so that the press or other machine to which it is attached may be run continuously instead of as a single stroke device.

Further objects of the invention will be apparent from the following description in which reference is had to the accompanying drawings, wherein Figure 1 is a vertical axial cross-section of the crank shaft and rolling key clutch assembly of a power press equipped with the safety device according to the present invention.

Fig. 2 is a vertical cross-section taken along the line II—II of Fig. 1, the safety catch or clutch detent mechanism being shown in elevation with the detent in the active position.

Fig. 3 corresponds to Fig. 2 except that the clutch detent mechanism is shown in vertical axial cross-section, the detent being shifted into the idle position.

Fig. 4 is an end view of the detent mechanism shown in Fig. 2 as it appears viewed from the right.

Fig. 5 is a cross-section taken along the line V—V of Fig. 2.

Figs. 6, 7 and 8 show the cam ring controlling the automatic detent coupling device in side, rear and front elevation respectively.

Fig. 9 is a vertical cross-section showing the relationship between the driving and driven elements of the rolling key clutch.

Fig. 10 is an end view of the cam ring which positively returns the clutch detent to the active position.

Fig. 11 is a plan view of the cam ring shown in Fig. 10, the view being taken from below.

Fig. 12 is a fragmentary axial section of the automatic rotary coupling mechanism shown at the right of Fig. 2.

In the following description a safety stop device according to the present invention will be described as applied to a power press equipped with a rolling key clutch of the type set forth in United States Patent No. 1,501,422, granted July 15, 1924, to R. W. Strout, but it will be understood that this represents only one of many uses to which the invention is applicable.

Power presses are frequently used as single stroke machines, the press being brought to rest after each cutting or forming operation to afford ample time for the operator to insert a new blank. When the press is set up for this type of operation the operator naturally acquires a certain degree of confidence in the automatic stopping mechanism and often becomes careless to the extent that in feeding the blanks between the dies he will permit his hands to occupy positions where they would be seriously injured by the accidental movement of the press. Failure of the automatic stop devices with which single stroke presses are ordinarily equipped has resulted in many serious accidents.

To avoid as far as possible accidents of this nature, the safety stop according to the present invention is positively actuated by rugged mechanical elements which can not fail to bring the press to rest unless one of these elements actually breaks in two, and this, in view of the comparatively light duty ordinarily imposed upon them, is not likely to occur. In apparatus hitherto known, one or another movements of the automatic stop mechanism in bringing the press to rest have been controlled by non-positive means such as springs or weights, which are liable to get out of order, and which, even when in working order, are not sufficiently powerful in their action to overcome a tendency to bind or jam when comparatively slight misalignment of the parts may occur or when some small particle of foreign material is caught between the working surfaces thereof.

Referring to the drawings, the apparatus according to the present invention is illustrated as applied to a press adapted to be used for single stroke work, Fig. 1 illustrating the general relationship of the stop mechanism to the crank shaft and clutch associated therewith. The numeral 1 designates the crank shaft, upon the right hand end of which a driving wheel 2 is mounted. The said wheel is driven by a belt or otherwise in accordance with usual practice and revolves continuously. Interposed between the driving wheel and the crank shaft is a rolling key clutch of well known design. The rolling key 3 of the clutch is disposed in a partial cylindrical keyway 4 formed in the crank shaft 1, the key having a cross-section which permits in one position of the key lying wholly within the circumference of the crank shaft, and in another position allowing a portion of the key to enter a corresponding partial cylindrical recess 5 in the hub portion 6 of the driving wheel (see Fig. 9). To permit of the engagement of the clutch at points not more than 90° apart, the hub portion of the driving wheel is provided with four of the said driving recesses, as shown. At the right-hand end of the rolling key 3 a torsion spring 7 is provided, the said torsion spring being connected to the cylindrical key body in such manner as to tend always to rotate the key into the position shown in Fig. 9, in which position a positive drive is provided between the driving wheel 2 and crank shaft 1. The right-hand end of torsion spring 7 is connected to a spring-adjusting plug 8 which is held in adjusted position by a set screw 9.

The rolling clutch clutch key 3 is moved into the declutching position shown in dotted lines in Fig. 9 by the clutch control arm 10 shown at the left-hand end of the rolling key 3 in Fig. 1. This arm is preferably formed integrally with the key and cooperates with a clutch detent 11 in such manner that upon a predetermined movement of the crank shaft in which the key is mounted the key will be rotated a sufficient distance to disengage it from the hub portion of the driving wheel.

The rolling key control arm 10 or clutch control arm, as it may be termed, presents a stepped contour to the clutch detent 11, as best seen in Fig. 2. The arm is there shown in the position which it occupies when the clutch is disengaged. When the clutch is engaged the arm 10 is rotated counter-clockwise by the action of the torsion spring hereinbefore referred to, thus moving the arm upward to a position in which the first step 12 of the arm will strike against the detent 11 whenever the crank shaft is rotated a complete turn from top dead center. During the rotation of the crank shaft the clutch control arm is prevented from being rotated by the spring beyond the position representing the correct engagement of the rolling key with a driving recess in the hub portion 6 of the driving wheel, by the engagement of the arm 10 with the radial stop surface 13 formed in the end of a sleeve 14 keyed to the crank-shaft. A similar stop surface 15 checks the clockwise rotation of the clutch control arm 10 for a purpose hereinafter to be set forth. It will be observed that the sleeve 14 and a similar sleeve 14ᵃ secured to the crank-shaft on opposite sides of the driving wheel afford the actual bearing surface for the latter. In this manner the crank-shaft is protected from wear and the sleeves when worn are readily replaced.

As the crank shaft of the press approaches top dead center, the clutch detent 11 engages the step 12 on the control arm, the arm being thereby rotated counter-clockwise and the rolling key disengaged from the driving wheel. When this disengagement occurs the step 12 will have been swung upwardly a sufficient distance to permit it to ride over the detent 11 and the press will come to rest with the parts in the position indicated in Fig. 2. It will be understood that any suitable friction means may be provided in accordance with usual practice to bring the press to rest at this point. In Fig. 1 there is illustrated at the left-hand end of the crank shaft a brake drum 17 surrounded by a brake band 18 suitable for this purpose. This brake device may be permanently adjusted to produce the required braking effort to bring the crank shaft of the press to rest when it reaches top dead center. The release of the rolling key clutch always occurs at a definite point during the revolution of the crank shaft because of the angular setting of the clutch control arm, this point having a sufficient angular advance to permit of the normal braking effort of the brake device 17, 18 stopping the crank shaft of the press at top dead center, as above set forth.

Should the braking device get out of adjustment through wear or otherwise, so that the crank shaft is permitted to overrun the top dead center point, a positive stop is provided to prevent the sliding head of the press from descending a sufficient distance to injure the operator's hands. This stop comprises the second stepped portion 20 of the clutch control arm. A comparatively small angular displacement of the crank shaft beyond top dead center (counter-clock-wise in Fig. 2) will cause the vertical face of step 20 to engage the clutch detent 11 and because of the fact that the control arm is prevented from rotating backwardly by the stop surface 15, a direct mechanical connection between the detent 11 and the crank shaft 1 will occur. If the detent were rigidly mounted the press would be brought instaneously to rest and this would subject the several parts of the stop mechanism to unnecessary shock. To avoid this shock the detent is provided with a buffer spring 21 surrounding the rock shaft 22 on which the detent is mounted. As shown in Fig. 3, the rock shaft is journaled in a bracket 23, the bracket providing two bearings 24, 25 for said shaft. It will be observed that the normal position of the detent 11 which is prefebaly formed integrally with the rock shaft 22, is that indicated in solid lines in Fig. 3. The shaft is, however, axially slidable, and if sufficient pressure is applied to overcome the force of spring 21 the detent will assume the position indicated in dotted lines in Fig. 3. The detent will also assume this position in case the spring 21 should break. In this event the comparatively light impact of the clutch control arm step 12 as it engages the detent to release the rolling key clutch will move the detent to the dotted line position. As will be hereinafter more fully explained, this movement of the detent which occurs when the buffer spring is broken, results in a positive and unmistakable warning to the operator by which he is informed of such breakage. The braking of the buffer spring does not, however, in any way affect the positive stopping of the press after each cycle of operation.

The rock shaft is shouldered at 26 to receive a ring or collar 27 against which the buffer spring exerts its force tending to move the rock shaft and detent to the left. The movement of the collar to the left is prevented by the end surface of bearing 24, and the rock shaft is prevented from slipping beyond the position to which it is moved by the buffer spring 21, by the retaining spring 28 which acts upon a nut 29 screwed onto the right-hand end of the rockshaft, the retaining spring tending always to hold the shouldered portion 26 of the rock shaft against the buffer spring collar 27. It will be understood that the buffer spring should be of rugged construction in order to effectively cushion the impact of the clutch control arm against the detent 11. There being associated with the clutch control arm the entire mass of the crank shaft and moving head of the press, the impact upon the detent in bringing these parts to rest, even when they are traveling very slowly, as they always will be under the control of the press brake, has considerable force.

The retaining spring 28 has another function than that of holding the detent rock shaft in proper axial position, as will be apparent in the following description of the automatic coupling device, by means of which the manual control of the detent is disengaged therefrom after each movement of the control by the operator. It will be understood that the term "manual control" is used to indicate any type of control which is moved at the will of the operator. In power presses the control member is usually a treadle actuated by the operator's foot. In the embodiment illustrated, the treadle or other manually-controlled member is connected to the rod 30, this rod being pivotally connected at its upper end to an arm 31 formed on a coupling member 32 surrounding the rock shaft 22. The portion of the rock shaft extending to the right within the said coupling member is cut down to a squared cross-section, the diagonals of this squared portion of the shaft representing the full diameter of the rock shaft so that a bearing is provided for the coupling 32 over the greater part of its entire length by the small longitudinal surfaces 34 which remain when the flat surfaces 35 are formed to provide the squared section of the rock shaft.

The right-hand end of the central bore through the coupling member 32 is restricted by an inwardly extending flange 36 as best seen in Figs. 3, 5 and 12, this flange having a squared central opening which fits over the squared portion of the rock shaft when the parts are engaged. The engagement of flange 36 with the said squared portion of the rock shaft provides a positive drive between the automatic coupling member 32 and the rock shaft, whereby when the said member is rotated by the manual depression of rod 30, the rock shaft will be similarly rotated and thereby the clutch detent 11 swung into its inactive or idle position shown in dotted lines in Fig. 1. In this position the clutch control arm 10 is released, and under the action of torsion spring 7, as hereinbefore set forth, the rolling clutch key 3 will spring into engagement with the first of the driving recesses 5 which is brought opposite the key by the rotation of the driving wheel 2.

After the operator has effected the engagement of the clutch through the manual displacement of the clutch detent 11 in the manner described, the automatic coupling mechanism according to the present invention disconnects the manual control member from the detent whereby said detent may be mechanically and without further intervention on the part of the operator, restored to the active position shown in solid lines in Fig. 1.

in which position the clutch control arm will be engaged and the press brought to rest, as hereinbefore set forth, upon the completion of a single stroke or cycle of operation. Furthermore, the action of the automatic coupling mechanism is such that the operator can not cause a second or repeat operation of the press until the treadle or other manually-controlled means is returned to its initial position. That is to say, if the operator depresses the treadle, the press will be set in motion and perform a single cycle of operation, and even though the operator continues to hold the treadle in the depressed position, no further movement of the press will occur.

The disengagement of the automatic coupling device which permits of the mode of operation above set forth, is, in the present embodiment of the invention, effected by cam elements 40. These elements comprise oppositely inclined surfaces diametrically disposed upon a ring 41 (see Figs. 5 to 8 inclusive). The ring 41 is concentrically mounted with respect to the rock shaft 22, being rigidly fastened at the end of rock shaft bearing 25. The ring may be provided with lugs 42 which engage corresponding recesses in the bearing member 25, the ring being held in place by means of screws 43.

The rotatable coupling member 32 carries diametrically-disposed radial projections 44 which cooperate with the inclined surfaces 40 of the cam ring 41 to produce an axial movement of the coupling member 32 when said member is manually rotated. Since the effective driving engagement between the coupling member 32 and the rock shaft 22 upon which the clutch detent 11 is mounted, is obtained by the engagement of the internal square apertured flange 36 with the squared portion 34, 35 of the rock shaft, it will be clear that a comparatively small axial movement of the coupling member 32 toward the right will result in uncoupling or disengaging said member from the rock shaft. When this disengagement occurs the relationship of the coupling member to the rock shaft is that illustrated in Fig. 3, the flange 36 having been moved to the right a sufficient distance to completely escape from the squared portion of the rock shaft.

After the disengagement of the coupling device, it being remembered that prior to such disengagement the press has been set in motion, the detent 11 is positively restored or reset in its active position through the action of a cam ring 50 which is mounted upon the crank shaft adjacent to the detent. This cam ring will be hereinafter more fully described.

It will be noted that while the detent has been automatically reset to the active position in which it will disengage the rolling clutch key and bring the press to rest, the control rod 30 which has been actuated by the operator is still disconnected from the detent because the parts of the automatic coupling device, as hereinbefore set forth, remain in the position indicated in Fig. 3. The operator therefore can not move the detent 11 to bring about a subsequent operation of the press until the driving connection between the rock shaft 22 and the coupling member 32 is reestablished.

As diagrammatically indicated in Figs. 1 and 4, a spring 51 is provided to restore the manually-controlled rod 30 to its initial position, and this will occur whenever the operator releases the treadle or other manually-operable member by which the press is controlled. The upward movement of rod 30 will cause a counter-clockwise rotation of the coupling member 32, as seen in Figs. 4 and 5, and this counter-clockwise rotation will permit the projections 44 on the coupling member to slide down the cam inclines 40, this resulting in an axial movement of the coupling member 32 toward the left in Fig. 3. The left-hand end of spring 28 presses against a freely slidable collar 52, which, in turn, presses against the coupling member 32, tending to slide it along the rock shaft. The coupling member 32 can not move to the left any appreciable distance or effect a rotative coupling with the rock shaft until the square aperture of the flange 36 is rotated sufficiently to cause said aperture to register with the squared section of the rock shaft. This registration will occur when the treadle bar 30 has traveled upwardly nearly to its highest position. Almost immediately after the engagement of the rolling key clutch caused by the depression of the treadle, the clutch detent 11 is reset by the movement of cam ring 50 to its initial or active position, thus rotating the squared section of the rock shaft so that it no longer registers with the square aperture of the coupling member 32. It will therefore be apparent that before the male and female members of the coupling can be reengaged, the treadle-controlled member 32 must be permitted to assume its initial position under the action of spring 51. The engagement of the detent 11 with the end of the driving wheel hub prevents the detent from being swung beyond the proper position to engage the clutch control arm 10, as will be seen in Fig. 1. The detent being thus prevented from rotating further, will be overtaken by the rotation of the coupling member 32 so that registration must occur between the squared members of the coupling if the operator permits the treadle to rise to its full height. At the instant such registration occurs, the spring 28 will cause the coupling member 32 to shift to the left, thereby effectively coupling the manually-controlled member 32 to the rock shaft upon which the clutch detent 11 is mounted.

Should the buffer spring 21 break, the next impact of the clutch control arm against the detent 11 will shift the rock shaft to the right to the position indicated in dotted lines in Fig. 3. In this position the squared section 34, 35 of the rock shaft will have advanced through the square aperture of coupling member 32 a sufficient distance to prevent a disengagement of the coupling upon a subsequent manual movement of the said member. That is to say, the axial movement produced by the cam surfaces 40 when the external coupling member 32 is rotated by depression of the treadle is insufficient to withdraw the squared portion of the member 32 from the end of the squared section of the rock shaft when said shaft occupies the abnormal position indicated in dotted lines. It will be understood that the shaft occupies this abnormal position whenever the buffer spring 21 is broken or defective. The result of this action is that the treadle will not be disconnected in the normal manner from the rock shaft and therefore immediately upon the action of the cam ring 50 in resetting the detent 11 to the active position the treadle will be thrown vigorously upward, there being under these conditions a positive mechanical linkage between the detent and the treadle. The movement is so sudden that it will almost always throw the operator's foot from the treadle, and, in any event, will give him adequate warning of the fact that the buffer spring has ceased to function properly.

To complete the description of the automatic releasable coupling mechanism, it will be noted that the nut 29 which is screwed on to the right-hand end of the rock shaft 22 retains the spring 28 upon the shaft and provides a ready means for adjusting the tension of said spring. The nut is held in a desired adjustment by means of a washer 55, the washer being slidable axially of the rock shaft, but prevented from rotating thereon by a lug 56 which projects into a longitudinal keyway 57 formed in the threaded portion of the rock shaft. This washer has an upturned finger 58 which engages a flat surface of the nut 29, thereby preventing the rotation of the nut. To release the nut for adjustment or replacement of the spring, the non-rotatable washer 55 is moved to the left against the action of spring 28 a sufficient distance to permit the finger 58 thereof to escape the nut.

The cam ring 50 which resets the detent 11 into the active position during each actuation of the press is preferably formed in two semi-circular sections 50', 50" which are clamped together around the crank shaft 1 of the press by means of countersunk screws 59. The cam ring is also preferably keyed to the crank shaft, as indicated at 60, to insure the proper angular relationship of the cam to the shaft. A set screw 61 may also be employed to insure against any axial displacement of the ring along the shaft. The major arc of the cam ring extending in Fig. 2 in a clockwise direction from the dotted line marked A to the line marked B, presents a continuous flat surface which at no point will permit of the detent 11 being moved from the active position indicated in solid lines in Fig. 1. In Fig. 2, to the left of the line B, the cam surface is cut away at right angles to the plane of the cam ring, the depth of this excavation being sufficient to permit the clutch controlling detent 11 to be swung out of the path of the clutch control lever 10. This idle position of the detent is indicated in dotted lines in Fig. 1, in which Figure the excavation 62 of the cam is clearly seen.

The excavated portion of the cam ring between the lines B and C presents a substantially flat surface to the detent, insuring a dwell in the movement of said detent sufficient to permit the passage of the clutch control arm 10 before the detent is moved outwardly into the path of such control arm for a subsequent engagement therewith. This outward movement of the detent from the idle to the active position is effected by the inclined surface of the cam ring lying between the lines C and A, it being understood that the cam ring rotates counter-clockwise, as indicated by the arrow in Fig. 2. It will be noted that the construction of the cam ring 50 and the clutch controlling detent 11 is of so rugged a character that the detent will be moved into the position to release the clutch with great certainty, it being highly improbable that either the cam ring or the detent which it actuates could be deranged by any normal use because these parts are not subjected to excessive wear or shock. The detent 11 when moved from the idle to the active position, moves quite freely, there being no resistance to its motion other than the slight friction at the rock shaft bearings and the friction due to the small end thrust produced by spring 28. Hence it will be seen that the normal effort of the cam ring 50 required to reset the detent is almost negligible. Should, however, there be any tendency for the rock shaft to bind in its bearings, the potential power of the cam ring to move the detent is sufficient to overcome any such tendency to the extent that it may be said that the detent is at all times and under all conditions reasonably to be anticipated, positively actuated.

*Operation.*—Initially the press is at rest with the crank shaft 1 in the position indicated in Figs. 1 and 2, the crank being approximately at top dead center. To cause the press to perform its cycle of operation which occurs in one complete revolution of the crank shaft, the operator depresses the treadle connected to rod 30. The coupling member 32 being at this time operatively connected to the rock shaft 22 will cause said shaft to swing through an arc sufficient to move the clutch detent 11 from the active position shown in solid lines in Fig. 1 to the idle position shown in dotted lines. The rolling key clutch member 3 being no longer restrained by the engagement of detent 11 with the clutch control arm 10, will, as soon as a driving recess 5 of the driving wheel 2 comes opposite the key, swing into engagement therewith under the action of torsion spring 7. The rolling key clutch thus engaged occupies the position indicated in solid lines in Fig. 9, the rotation of the key beyond the effective driving position being prevented by the engagement of the control arm 10 with the stop surface 13.

The depression of the treadle whereby the detent 11 is shifted to the idle position also results in a disengagement of the automatic coupling device connecting the treadle with the detent rock shaft, this being brought about through the cam action of the inclined surfaces 40 which shift the coupling member 32 to the position indicated in Fig. 3, in which position the squared aperture 36 of the coupling member 32 escapes from the squared section 35 of the rock shaft. With the parts in this position the treadle is no longer operatively connected to the detent. Almost immediately after this occurs, the inclined surface extending from C to A on the detent resetting cam ring 50, resets the detent 11 into the active position, and thus also rotating the rock shaft 22 so that its squared section no longer registers with the square aperture of the manually-controlled coupling member 32. The crank shaft continues to rotate until the step 12 of the clutch control arm engages the detent 11. This engagement results in a rotation of the rolling key 3 whereby the key is withdrawn from the driving recess 5 and the crank shaft thus disconnected from the driving wheel. The brake device 17, 18 is so adjusted that upon the disengagement of the clutch, as above set forth, the crank shaft and associated parts will be brought to rest in the position indicated in Figs. 1 and 2, this being the correct starting position for a succeeding cycle of operations.

Should the brake device be improperly adjusted so that the crank shaft is permitted to go beyond top dead center, the step 20 of the clutch control arm 10 will engage the detent 11, and because the control arm can not swing backwardly after it engages the stop surface 15, the detent will effectively check the rotation of the crank shaft. Excessive shock against the detent is prevented by the buffer spring 21 which permits the detent to recoil somewhat. Should this buffer spring become damaged so that the detent occupies the position indicated in dotted lines in Fig. 3, the disengagement of the automatic coupling device between the treadle and the detent is prevented because of the axial movement of the rock shaft 22, and thus the operator will be informed of a defect in the buffer spring because the treadle will be thrown upward by the action of the cam ring 50 in restoring the detent to the active position.

At any time after the detent has been restored by the cam ring to the active position, release of the treadle by the operator will result in recoupling the member 32 with the rock shaft 22. The treadle spring 51 causes rod 30 to move upwardly, and this rod being connected to arm 31 on the coupling member 32, rotates this member until its square aperture registers with the squared section of the rock shaft. The spring 28 causes the male and female parts of the coupling to reengage at the instant such registration occurs, it being understood, of course, that when the coupling member 32 is restored to its initial angular position the cam engaging projections 44 are no longer in contact with the inclined surfaces 40 of the cam ring.

Should it be desired to operate the press continuously instead of as a single stroke machine, this can readily be done by simply removing the divided cam ring 50 from the crank shaft. In the absence of this cam ring the clutch detent is not automatically reset after its initial movement to the inactive position, and therefore the rolling key clutch will remain in engagement continuously during any desired number of revolutions of the press.

While only a single embodiment of the safety device according to the present invention has been hereinbefore described and illustrated, the invention is not limited thereto but may be otherwise variously modified and embodied without departing from the spirit thereof, as set forth in the following claims.

What we claim is:

1. A safety device for power press machines and the like, said device comprising a spring-engaged clutch, a detent to hold said clutch out of engagement, a manually operable member adapted to shift said detent into an idle position to permit the spring engagement of the clutch, automatic coupling means adapted in one position to connect said member and said detent, said coupling means being operatively connected to said member whereby upon a predetermined movement thereof the member will be disconnected from said detent, and detent resetting means operatively connected to the machine and adapted upon a predetermined movement thereof to restore said detent to its active position whereby to restrain the clutch from being automatically engaged by the action of the clutch spring.

2. A safety device for power press machinery and the like, said device comprising a clutch, yielding means tending to engage said clutch, a clutch control arm, a movable detent cooperating in its active position with said arm to hold the clutch out of engagement, the detent in its idle position being disposed so as to permit the engagement of the clutch through the action of the said yielding means, automatic clutch disengaging means cooperating with a moving part of the machine to disengage said clutch upon a predetermined movement of the machine, automatic detent resetting means acting in timed relationship with respect to said clutch disengaging means to restrain the clutch from being automatically reengaged by the action of the said yielding means, a manually operable member adapted when moved from an initial position to shift the said detent into the idle position to permit the clutch to be engaged by the action of said yielding means, releasable coupling means between said member and said detent, and coupling control means controlled by the manual movement of the said manually operable member and adapted to release said coupling when the member is moved to effect the engagement of said clutch.

3. The safety device according to claim 2, further characterized in that the said coupling actuating means is adapted to automatically connect the coupling when the said manually operable member is returned to the initial position preparatory to a subsequent clutch engaging movement.

4. The safety device according to claim 2, further characterized in that a return spring is provided for said manually operable member whereby when the member is released it will be automatically restored to the said initial position.

5. The safety device according to claim 2, further characterized in that the said detent resetting means is mechanically positive in action.

6. A safety device for single stroke power press machines and the like, said device comprising a rotary driving element, a rotary driven element, a rolling key clutch to connect said elements, a spring tending to engage said clutch, a clutch control arm rotating with said driven element, a movable detent mounted upon a stationary part of the machine and adapted in its active position to lie in the path of said clutch control arm and in its idle position to escape said path, detent resetting means controlled exclusively and in a mechanically positive manner by the movement of said driven element and adapted to move the detent into the said active position only upon a predetermined movement of the said driven element, a manually operable member adapted to move said detent into the idle position whereby to permit the spring engagement of the clutch, and an automatically releasable coupling between said detent and said manually operable member whereby the manually operable member will be disconnected from the detent before said detent is restored to active position by said positive detent resetting means.

7. The safety device according to claim 6, further characterized in that a rock shaft rigidly carries said detent, said manually operable member being rotatable coaxially and axially slidable with respect to said rock shaft, the said automatically releasable coupling between said detent and member comprising axially engageable male and female parts, one of said parts being associated with said manually controlled member, the other part being formed on said rock shaft, and a cam interposed between the said member and a stationary element, said cam being adapted to axially shift said member as the member is rotated, whereby after turning the rock shaft a sufficient distance to move the said detent into the idle position the male and female parts of the coupling will be disengaged, thereby releasing the detent.

8. A safety device for single stroke power press machines and the like, said device comprising a clutch, a clutch control arm rotating with a moving part of said clutch, a clutch controlling detent cooperating with said arm, a rock shaft on which said detent is mounted, a manually operable member coaxially rotatable and slidably mounted with respect to said rock shaft, an axially engageable mechanical coupling comprising interfitting parts of said rock shaft and member, and means controlled by the rotation of said member to axially disengage said interfitting parts upon a predetermined movement of said detent carrying rock shaft.

9. The safety device according to claim 8, further characterized in that a brake is provided, said brake being adapted to automatically bring said moving part of the clutch to rest upon a disengagement of said clutch, at a point where the said clutch control arm engages the detent whereby when the machine is brought to rest the clutch will be disengaged.

10. The safety device according to claim 8, further characterized in that a detent resetting cam is mounted upon and rotated by said moving clutch part, the said cam having an initial contour which permits of the manual displacement of the detent into the inactive position, the succeeding working portion of the cam being formed to restore the detent to the active position, and automatic stop means adapted to bring the machine to rest in the position where the said initial contour of the cam is coextensive with the said detent.

11. The safety device according to claim 8, further characterized in that the said rock shaft is axially slidable, a buffer spring being provided for said rock shaft to cushion it against the impact of said clutch control arm, a stop to axially position the rock shaft against the action of said spring, the axial play provided for said rock shaft being sufficient in the event of spring breakage to permit the rock shaft under the impact of said clutch control arm to approach the said manually operable member to a point where the said member can no longer be axially disengaged from the said rock shaft.

12. A safety device for single stroke power press machines and the like, said device comprising a clutch, a clutch control arm rotating with the driven member of said clutch, a detent cooperating with said arm, a rock shaft carrying said detent, the axis of said rock shaft being transverse to the axis of said driven member, a cam ring mounted on said driven member, the working face of said cam ring being adapted over a portion of its travel to permit the detent to be swung into the inactive position and over another portion to swing said detent into the path of said clutch control arm, a pedal, a releasable coupling between said pedal and said detent, releasing means for said coupling controlled by the operator's movement of said pedal, and yielding means to return said pedal to the position from which it is moved by the operator.

13. The safety device according to claim 6, further characterized in that the said detent resetting means comprises a divided cam ring surrounding the said rotary driven element, and screw means being provided to hold the sections of said ring together, said divided cam ring having a working face which presents a substantially continuous surface adapted to hold the said detent in active position, said face being recessed over a comparatively short arc so as to permit the said detent to be manually shifted into inactive position during only a relatively small range of angular movement of the said driven element.

14. The safety device according to claim 8, further characterized in that automatic detent resetting means are provided to restore said detent to a position in which it may be engaged by the said clutch control arm, and the said interfitting parts of the said mechanical coupling being so formed as to prevent their operative engagement after the detent has been reset by said automatic means, until the said manually-operable member has been restored to a predetermined angular relationship with respect to said detent.

15. A safety device for single stroke power press machines and the like, said device comprising a clutch, a clutch controlling element rotating with a moving part of said clutch, a pivoted detent cooperating with said element and adapted in its operative position to prevent the engagement of said clutch, a manually-controlled member coaxially rotatable and axially slidable with respect to said pivoted detent, an axially engageable mechanical coupling interposed between said detent and said member, means controlled by the manual rotation of said member to disengage said mechanical coupling after said detent has been swung to an idle position, and automatic means adapted to restore said detent to its operative position after the disengagement of said mechanical coupling.

16. The safety device according to claim 15, further characterized in that yielding means are provided to effect the engagement of the said coupling interposed between the detent and the said manually-operable member, and the said coupling being formed so as to prevent its engagement under the action of said yielding means except when said manually-controlled member has been restored to a predetermined angular relationship with respect to said detent.

17. The safety device according to claim 15, further characterized in that a lever is connected to operate said manually-controlled member whereby to rotate the said pivoted detent to an idle position, the angular movement imparted to said member by the normal full manual throw of said lever being in excess of the angular movement necessary to effect the disengagement of the said mechanical coupling, whereby after the lever has been manually thrown, the reengagement of said coupling upon a partial reverse movement of said lever, will be prevented.

In witness whereof, we have hereunto signed our names.

JOHN O. SARHEIM.
OVE A. OLSEN.